United States Patent [19]

Epple et al.

[11] Patent Number: 6,048,944
[45] Date of Patent: Apr. 11, 2000

[54] ALIPHATIC EPOXIDE-AMINE ADDUCTS WITH SUBSTANTIAL SIDE-CHAIN BRANCHING, PROCESS FOR THEIR PREPARATION, AND THEIR USE

[75] Inventors: Ulrich Epple, Wiesbaden; Manfred Marten, Mainz; Uwe Kubillus, Wiesbaden; Harald Oswald, Hofheim, all of Germany

[73] Assignee: Vianova Resins GmbH, Mainz-Kastel, Germany

[21] Appl. No.: 09/006,388

[22] Filed: Jan. 13, 1998

Related U.S. Application Data

[62] Division of application No. 08/641,733, May 2, 1996, Pat. No. 5,929,272.

[30] Foreign Application Priority Data

| May 2, 1995 | [DE] | Germany | 195 15 916 |
| Jun. 8, 1995 | [DE] | Germany | 195 20 855 |

[51] Int. Cl.$^7$ ........................................ C08F 8/30
[52] U.S. Cl. .................. 525/375; 525/328.8; 525/379; 525/382; 525/385; 525/438
[58] Field of Search ................. 525/382, 385, 525/375, 374, 438, 328.8

[56] References Cited

U.S. PATENT DOCUMENTS

| 4,565,730 | 1/1986 | Poth et al. ......................... 428/204 |
| 5,098,956 | 5/1992 | Blasko et al. ........................ 525/123 |
| 5,126,170 | 6/1992 | Zwiener et al. ..................... 427/385.5 |
| 5,214,086 | 5/1993 | Mormile et al. . |

FOREIGN PATENT DOCUMENTS

| 2084444 | 6/1993 | Canada . |
| 2106048 | 3/1994 | Canada . |
| 0 677 539A | 10/1995 | European Pat. Off. . |
| 0 741 149A | 11/1996 | European Pat. Off. . |
| 39 08 875A | 9/1990 | Germany . |
| 43 24 801A | 1/1995 | Germany . |
| 02251516 | 10/1990 | Japan . |
| 92 22618 | 12/1992 | WIPO . |

OTHER PUBLICATIONS

Muramatsu et al., "Manufacture of Polyurethane–Polyureas Containing Function Groups", JP 02251516 A2, Abstracts of Japan (1995).
Chemical Abstracts vol. 116, No. 16, Apr. 20, 1992.
Chemical Abstracts vol. 114, No. 14, Apr. 8, 1991.

*Primary Examiner*—Bernard Lipman
*Attorney, Agent, or Firm*—Foley & Lardner

[57] ABSTRACT

Epoxide-amine adducts having a proportion by mass of at least 20% of aliphatic epoxide or amine units which comprise at least one tertiary or quaternary carbon atom are disclosed. The adducts are employed as binders for coatings of relatively high environment-friendliness, if desired, for example, in a mixture with other hydroxy-functional binders, and as reactive component in corresponding adhesive compositions and sealing compounds.

15 Claims, No Drawings

ALIPHATIC EPOXIDE-AMINE ADDUCTS WITH SUBSTANTIAL SIDE-CHAIN BRANCHING, PROCESS FOR THEIR PREPARATION, AND THEIR USE

This application is a divisional of application Ser. No. 08/641,733, filed May 2, 1996 U.S. Pat. No. 5,929,272.

BACKGROUND OF THE INVENTION

1. Field of the Invention

The present invention relates to epoxy amine adducts having substantial side chain branching, processes for making them and to binders that employ these adducts. The binders are environmentally safe, have a low solvent content and can be used in pigmented and unpigmented systems.

2. Description of Related Art

To protect the environment, it has been an objective to reduce the emission of organic compounds, especially the amount of solvent. The solvent content of adhesives, sealing compounds and coating materials must be reduced in the future from the values which are still customary today, on the basis of statutory regulations (e.g. VOC (Volatile Organic Compounds) regulations in the USA and Great Britain and "TA Luft" [German air pollution control regulations] in Germany).

This county-specific statutory pressure is exerted with varying degrees of severity in different countries. The statutory authority permits different evaluations (individual considerations, combined considerations), which impel the producer of such coating, adhesive and/or sealing products to provide new and different levels of technical performance. This has reached the extent where the usually high performance level of such products must on environmental grounds be cut back to a minimum level.

Clearcoats as unpigmented systems are employed in automotive refinishing, for example, as the topmost coat. Their function typically is to protect the pigmented, lower coat (basecoat) against mechanical stress, against the effect of weathering and against dirt, and to provide the overall coating system with the necessary gloss. These clearcoats predominantly have been formulated with polymeric binders which have usually been employed simultaneously in pigmented topcoats as well. The severe VOC regulations, however, force the producer of raw materials to formulate this clearcoat separately, in some cases, with the addition of low molar mass polyols, as a "blend system" (EP-A-0 588 314, EP-A-0 129 124 and U.S. Pat. No. 5,098,956).

Various methods can be used to reduce the solvent content. For example, polymeric binders of extremely low molar mass are used, alone or in blends with binder components of higher molar mass. Highly complex binder systems are known, for example, which comprise mixtures of oligomeric caprolactone polyols, i.e. polyester polyols with acrylate polyols and/or acrylate star polymers (WO 92/22618). Certain organic compounds, for example, aspartic acid derivatives, aldimines, ketimines or oxazolidines (EP-A-0 470 461, EP-A-0 403 921, U.S. Pat. No. 5,214,086, and Robinson et al., "High performance polyurethane coatings systems utilizing oxazolidine based reactive diluents" 21st Higher Solids and Waterborne Coatings Symposium (February 1994) New Orleans, La., USA) also are described as reactive diluent systems or as sole binders.

The maximum amount of volatile organic constituents that are permitted for the clearcoat in automotive refinishing in California, for example, is 3.5 lb/gal (0.42 kg/dm$^3$), i.e. a mass fraction of solids of about 59% in the coating material (DIN 53 211, 4 mm cup, 21 s flow time at 23° C.). The restrictions become more severe when a conventional basecoat is applied: the overlying clearcoat must not exceed a VOC limit of 2.1 lb/gal (0.25 kg/dm$^3$, i.e. a mass fraction of solids of about 75% ). Important processing properties then are lost when extremely low molar mass polyols are used, for example, the rapid drying of the clearcoat. When the above-mentioned organic compounds are employed, there is no guarantee of a long pot life (processing time). In addition, partial dissolution of the basecoat or skinning, in some cases cloudiness, and gas-escape defects are observed with the rapid reactive diluent systems. The original aim of enabling the use of these binders in pigmented systems as well as unpigmented systems, however, cannot be achieved in this case.

Thus, there exists a need to develop environmentally friendly binder systems having a low solvent content which give rise to rapid drying, a long pot life, little or no partial dissolution of the basecoat, and no skinning, cloudiness or gas-escape defects. There also exists a need to provide binder systems that are universally useful in unpigmented and pigmented systems. Moreover, there exists a need to be able to use these systems in environmentally friendly adhesives and sealing compounds.

SUMMARY OF THE INVENTION

It is therefore an object of the present invention to provide aliphatic epoxide-amine adducts, processes for their manufacture and their use in binder systems which do not suffer from the aforementioned disadvantages. It is an additional object of the invention to provide these epoxide-amine adducts, processes for their manufacture and their use in binder systems whereby the binder systems are environmentally friendly, have a low solvent content, can be dried rapidly, have little or no partial dissolution of the base coat, have no skinning, cloudiness or gas-escape defects, and which are universally useful in pigmented and unpigmented systems.

In accordance with these objectives, it has surprisingly been found that the addition of aliphatic epoxide-amine adducts having special structures enables the development of binder systems of this type having the properties mentioned above.

In accordance with one object of the invention, there is provided epoxide-amine adducts having at least 20% by mass of aliphatic epoxide and/or amine units which comprise at least one tertiary or quaternary carbon atom. The mass fraction of such units is preferably at least 25%, particularly preferably at least 30%.

In accordance with additional objects of the invention, there are provided methods of making epoxide-amine adducts having substantial side-chain branching, and to binders employing these adducts. This invention therefore provides, in addition to the preparation of the epoxide-amine adducts with substantial side-chain branching, binder systems which comprise these adducts and environmentally friendly coating systems formulated therefrom. The invention further provides the use of these epoxide-amine adducts in environment-friendly coatings, adhesives and sealing compounds.

Further objects, features and advantages of the invention will become apparent to those skilled in the art from the detailed description of the preferred embodiments that follows.

DETAILED DESCRIPTION OF PREFERRED EMBODIMENTS

The expressions "chain-branched units" or "branched" as they are used herein denote those units having at least one tertiary or quaternary aliphatic carbon atom. Throughout this description, the expression "extremely low" or "low", insofar as they refer to the molar mass of the epoxide-amine adducts of the invention denotes a weight-average molar mass of less than about 3,000 g/mole. The expression "low" used in connection with solvent content refers to mass fractions of solvent of less than 35%.

With the high-solids, polymer-based binder systems, it is possible to achieve clearcoat solids contents of up to about 67% by mass. Mass solids contents higher than this usually can be obtained only with the aid of low molar mass ("monomeric") organic compounds of defined functionality. Compounds which comprise structural units similar to those of the low molar mass polyacrylate resins which can be employed in customary high-solids systems should be capable of homogeneous mixing with these resins (reactive diluent system) and, on application, should improve the drying properties. In this way, it should be possible to achieve the aim of a solids content of up to about 75% by mass. "High-solids systems" in this context are systems having a mass fraction of solids in excess of about 50%.

Any branched epoxide-amine adduct can be used in the present invention. Branched epoxide-amine adducts which are particularly suitable for the invention can be prepared by reacting a) aliphatic and/or cycloaliphatic monoepoxides having 7 to 33 carbon atoms and b) amines having at least two primary or secondary amino groups and 2 to 30 carbon atoms, whose primary or secondary amino groups are not attached directly to an aromatic structure, wherein at least 20% by mass of the monoepoxides is selected from aliphatic and cycloaliphatic monoepoxides having at least one tertiary or quaternary carbon atom. Epoxide-amine adducts that are prepared by use of the mono-epoxides selected from glycidyl esters of α-alkylalkanemonocarboxylic acids and glycidyl esters of α,α-dialkylalkanemono-carboxylic acids having in each case 8 to 21 carbon atoms in the esters, are particularly preferred.

Further suitable epoxide-amine adducts can be prepared by reacting a) aliphatic and/or cycloaliphatic diepoxides having 8 to 50 carbon atoms and b) primary or secondary monoamines having 4 to 30 carbon atoms, whose amino groups are not attached directly to an aromatic structure, wherein at least 20% by mass of the monoamines is selected from monoamines having at least one tertiary or quaternary carbon atom. Epoxide-amine adducts that are prepared using the diepoxides selected from the diglycidyl ethers of dihydric aliphatic alcohols and the diglycidyl esters of dibasic aliphatic carboxylic acids having 8 to 18 carbon atoms in the ethers and, respectively, 12 to 42 carbon atoms in the esters are particularly preferred.

Additional useful epoxide-amine adducts of the present invention can be prepared by reacting a) aliphatic and/or cycloaliphatic monoepoxides having 7 to 33 carbon atoms and b) monoamines selected from primary and secondary monoamines having 4 to 30 carbon atoms, whose amino groups are not attached directly to an aromatic structure, wherein at least a % by mass of the monoamines is selected from monoamines having at least one tertiary or quaternary carbon atom and at least b % by mass of monoepoxides is selected from aliphatic and cycloaliphatic monoepoxides having at least one tertiary or quaternary carbon atom, a and b each being greater than 0 and the sum of a and b being at least 20, preferably at least 25 and, with particular preference, at least 30. Epoxide-amine adducts that are prepared using the monoepoxides selected from glycidyl esters of α-alkylalkanemonocarboxylic acids and glycidyl esters of α,α-dialkylalkanemono-carboxylic acids having in each case 8 to 21 carbon atoms in the esters are particularly preferred.

The epoxide-amine adducts according to the invention preferably have at least one, and a maximum of two, secondary OH group(s) and at least one secondary (in the case of primary amines as precursors) or tertiary (in the case of secondary amines as precursors) amino group per molecule. Any remaining amino groups, if polyamines are used, with monoexpoxides, remain unchanged or are similarly converted into secondary or tertiary amino groups, depending on the stoichiometry. It is known that epoxide-amine adducts based on glycidyl esters of α,α-dialkylalkanemonocarboxylic acids with isophoronediamine can be employed for extending the chain length of isocyanate-terminated urethane prepolymers (JP 02251516 A2), with only the amino groups reacting and the secondary OH groups being retained. However, it was not known that these compounds could be employed as reactive diluents with both the amino groups and the hydroxyl groups reacting. These defined functional compounds, which can be used as a mixing component with polyisocyanates, lead simultaneously to polyurethane and to polyurea structures, the latter guaranteeing rapid curing and high pendulum hardness.

Owing to the high weather stability and high reactivity, the adducts preferably are prepared using aliphatic, sterically hindered or cyclic amines. Those skilled in the art will recognize that sterically hindered in this context denotes the presence of branched aliphatic structures or cycloaliphatic structures or aromatic structures. Examples of suitable diamines include neopentanediamine (2,2-dimethyl-1,3-propanediamine), 1,2-diamino-2-methyl-propane, diaminocyclohexanes, such as 1,2-diaminocyclohexane, and 1,4-diaminocyclohexane, xylylenediamines, such as m-xylylenediamine, 1,3-bis(aminomethyl)cyclohexane, 1-amino-2-aminomethyl-3,3,5(3,5,5)-trimethylcylopentane triacetone-diamine(4-amino-2,2,6,6-tetramethylpiperidine), 1,8-diamino-p-menthane, isophoronediamine(3-aminomethyl-3,5,5-trimethycyclohexlamine), 4,4'-diaminodicyclohexylmethane, 3,3'-dimethyl-4,4'-diaminodicyclohexylmethane, 3(4),8(9)-bis(aminomethyl)tricyclo-[5.2.1.0$^{2,6}$]decane. Examples of suitable monamines include ethylamine, butylamine, isobutylamine, tert-butylamine, hexylamine, cyclohexylamine, 2-ethylhexylamine, Primene 81R® (from Rohm & Haas, mixture of t-alkyl-substituted primary amines). It also is possible to employ mixtures of these amines.

Suitable epoxide-amine adducts also can be prepared from aliphatic diepoxides and aliphatic, branched monoamines, as is known for deposition coating materials in aqueous epoxide-amine chemistry and often is used as a principle of crosslinking reactions.

The aliphatic diepoxides useful in the invention can be selected from the esters and ethers of glycidyl alcohol with aliphatic dicarboxylic acids or aliphatic diols, respectively. Examples include ethylene glycol diglycidyl ether and butanediol diglycidyl ether; suitable esters are diglycidyl esters of (cyclo)aliphatic branched or unbranched dicarboxylic acids having 2 to 40 carbon atoms, for example, the diglycidyl esters of succinic acid, adipic acid, hexahydroterephthalic acid or dimeric fatty acids. For clearcoat applications, diglycidyl ethers are less preferred since, when used for exterior applications, they usually possess a poor weather resistance. Suitable monoamines usually contain at least one tertiary or quaternary carbon atom and a total of from 4 to 30 carbon atoms. Examples of useful monoamines include isobutylamine, tert-butylamine, 2-ethylhexylamine and Primene 81R® (from Rohm & Haas, mixture of t-alkyl-substituted primary amines).

The epoxide-amine adducts according to the invention can be prepared in any suitable manner, for example, by in a conventional manner, i.e. not in an aqueous medium. Then, the initially prepared epoxide-amine adducts having up to four functional groups (secondary hydroxyl groups, secondary or tertiary amino groups), can be diluted if desired in organic solvents or solvent mixtures and then subjected to crosslinking.

The reaction products of monoepoxide and diamine or monoamine, or of diepoxide and monoamine are readily obtainable with or without catalysts. Such products typically possess a weight-average molar mass of below 3000 g/mol, especially below 2000 g/mol and, in particular, below 1500 g/mol. The addition of these compounds to coating systems, for example, mixtures of two or more polyols, i.e. polyacrylate polyols or polyester polyols with or without the addition of known reactive diluents, pure polyols ("sole binders") and combinations of these possibilities leads to mass fractions of solids of up to about 75%. This target can be achieved in any case on the use of the epoxide-amine adducts alone with appropriate curing components.

The epoxide-amine adducts according to the invention can be prepared by the addition of the amine onto the epoxide at elevated temperature. The amine preferably is taken as an initial charge and reacted with the epoxide, usually without a catalyst, under an inert gas atmosphere at temperatures from about 50 to 150° C. until substantially no epoxide is present. Preferably, the amine is reacted with the epoxide until the epoxide is no longer present. The adducts prepared can be diluted to a selectable extent with any solvents or solvent mixtures, the choice of which is unrestricted.

The binders or binder mixtures of extremely low molar mass can, by addition of these epoxide-amine adducts, be increased in their mass fraction of solids in the coating material from about 67 to about 71% (DIN 53 211, 4 mm cup, 21 s, 23° C.). In accordance with the invention, these binders also can be increased in reactivity. As sole binders, these epoxide-amine adducts of the invention are extremely reactive and can be used together with appropriate curing agents in two-component adhesives or sealing compounds.

The use of such adducts as sole binders in coatings technology presupposes the slowing down of the curing reaction. Retarding (delaying) additives include, for example, organometallic compounds, electron-deficient compounds, certain acids or salts. Examples of suitable organometallic compounds are tin compounds, such as dibutyltin dilaurate, dibutyltin diacetate and dibutyloxotin, and also zinc octoate, or zirconium compounds. Examples of useful electron-deficient compounds include boron trifluoride, aluminum compounds and carbocations. Acids useful in the invention include, for example, formic acid, acetic acid, perchloric acid or trichloroacetic acid. Salts, such as triphenylmethyl perchlorate, tropylium hexachloroantimonate or acetyl perchlorate, also can be employed.

Such compounds typically are premixed with the epoxide-amine adducts, for example, and then form, with the nitrogen atoms of the amino groups and with the oxygen atoms of the alcohol groups, "chelate-like" complexes which, depending on complex strength, compete with the curing reaction. The mass fractions of solids of such coating systems comprising the binder adducts of the invention and curing agent usually are up to about 75% (DIN 53 211, 4 mm cup, 21 s, 23° C.). In order to slow down the curing reaction, it also is possible to reduce the functionality of such epoxide-amine adducts, by subsequently modifying them in whole or in part. Such modifications can comprise protecting groups (temporary) or can be permanent. For example, the secondary amino functions can be inactivated by reaction with isocyanate compounds of which each molecule contains on average from 0.8 to 1.5 free NCO groups and at least one tertiary amino group.

As examples of temporary protecting groups, the secondary alcohol and amine function can be reacted with aldehydes or ketones. The oxazolidines formed can easily be cleaved again using atmospheric moisture/water to form the original functionalities, which then are available successively for curing reactions. Such protected epoxide-amine adducts are likewise a part of the invention and are henceforth included under the term epoxide-amine adducts according to the invention.

The epoxide-amine adducts according to the invention, in combination with polyacrylate polyols, are particularly suitable for coating applications in one- and two-component systems, especially for high-solids systems, i.e. for solvent-containing mixtures having a high solids content. In these combinations, preference is given to employing mixtures comprising mass fractions of a) from 0.1 to 99.9% of hydroxyl-containing copolymers and b) from 99.9 to 0.1% of the epoxide-amine adducts according to the invention.

Examples of hydroxyl-containing copolymers include polyacrylates or polyesters. Polyester-modified acrylate resins also are included here. Particularly suitable hydroxyl-containing copolymers can be selected from:

aa) copolymers which are obtainable by copolymerization of at least two vinyl monomers of which at least one comprises at least one hydroxyl group;

ab) copolymers which are obtainable by copolymerization of at least two vinyl monomers of which at least one has at least one acid group and which are reacted, before, during or after polymerization, with at least one compound which reacts with the acid groups to form an ester with the formation of at least one hydroxyl group; and ac) copolymers which are obtainable by copolymerization of at least two vinyl monomers of which at least one has at least one hydroxyl group and which are reacted, before, during or after polymerization, with at least one compound which reacts partly or completely with the hydroxyl groups to form an ester with the formation of at least one hydroxyl group.

The copolymers of aa) can customarily be prepared in a free-radical solution polymerization. Products based on maleic esters can also be prepared in a bulk polymerization, i.e. without solvents. In copolymers of type ab) or ac), the additional freedom of the choice of polymerization method, solution or bulk polymerization, is afforded by the addition of specific compounds having relatively high boiling points. Examples of these compounds in the case of type ab) include glycidyl esters or glycidyl ethers and, in the case of type ac), include lactones.

Particular preference is given to those mixtures in which the epoxide-amine adducts according to the invention are added to a mixture of hydroxyl-containing copolymers which each have a hydroxyl number of from 10 to 250 mg/g and of which at least one has a weight-average molar mass of more than 3500 g/mol and at least one has a weight-average molar mass of below 3500 g/mol.

Examples of suitable solvents for the products obtained in accordance with the invention include aliphatic, cycloaliphatic and aromatic hydrocarbons, such as alkylbenzenes, for example xylene, toluene; esters, such as ethyl acetate, butyl acetate, acetates with longer alcohol residues, butyl propionate, pentyl propionate, ethylene glycol monoethyl ether acetate, the corresponding methyl ether acetate or propylene glycol methyl ether acetate; ethers, such as ethylene glycol acetate monoethyl, monomethyl or monobutyl ether; glycols; alcohols; ketones, such as methyl isoamyl ketone, methyl isobutyl ketone; lactones, and mixtures of such solvents. Other solvents which can be employed include reaction products of lactones with glycols or alcohols.

The present invention additionally relates to coating compositions which contain the epoxide-amine adducts according to the invention as binder component. In this context, it is preferred that the coating compositions comprise at least one epoxide-amine adduct according to the invention as a reactive diluent, and at least one further hydroxy-functional binder and at least one curing agent. These reactive diluent systems can be cured in the presence of suitable crosslinking agents without heating or at elevated temperature.

Any desired curing agents can be used in accordance with the present invention. Compounds which are suitable as the curing component in these coating compositions include amino resins, polyisocyanates, or compounds comprising acid and/or acid anhydride groups, individually or in combination. The crosslinking agent in each case can be added in a quantity such that the ratio of the number of OH or NH groups present in the binder or binder system to the number of reactive groups present in the crosslinking agent is between 0.3:1 and 3:1.

Amino resins suitable as curing components preferably are urea resins, melamine resins and benzoguanamine resins, individually or in a mixture. These are etherified products of the condensation of urea, melamine or benzoguanamine with formaldehyde. Suitable mixing ratios usually are in the range of from 50:50 to 90:10 hydroxyl- or amino-containing binder system to amino resin crosslinking agent, based on the mass of the solid resin. Appropriate phenolic resins and derivatives thereof can also be employed as curing agents. In the presence of acids, for example, p-toluenesulfonic acid, these crosslinking agents lead to curing of the coating. Hot curing can be undertaken in a customary manner at temperatures of from 90 to 200° C. in, for example, from 10 to 30 minutes.

Polyisocyanates also are suitable for curing the products according to the inventor with crosslinking, especially at moderate temperatures or at room temperature. Suitable polyisocyanate components include in principle all those aliphatic, cycloaliphatic or aromatic polyisocyanates known from polyurethane chemistry, individually or in mixtures. Highly suitable examples are low molar mass polyisocyanates, for example hexamethylene diisocyanate, 2,2,4- and/or 2,4,4-trimethyl-1,6-hexamethylene diisocyanate, dodecamethylene diisocyanate, tetramethyl-p-xylylene diisocyanate, 1,4-diisocyanato-cyclohexane, 1-isocyanato-3,3,5-trimethyl-5-isocyanatomethylcyclohexane (IPDI), 2,4'- and/or 4,4'-diisocyanatodicyclohexylmethane, 2,4'- and/or 4,4'-diisocyanatodiphenylmethane or mixtures of these isomers with their higher homologs. These curing agents are obtainable in a manner known per se by phosgenization of aniline/formaldehyde condensation products, 2,4- and/or 2,6-diisocyanatotoluene, or any desired mixtures of such compounds.

It is preferred, however, to use derivatives of these simple polyisocyanates as are customary in coating technology. These include polyisocyanates having, for example, biuret, uretdione, isocyanurate, urethane, carbodiimide or allophanate groups, as are described, for example, in EP-A 0 470 461 . Particularly preferred modified polyisocyanates include N,N',N'-tris-(6-isocyanatohexyl)biuret and its mixtures with its higher homologs, and N,N',N'-tris(6-isocyanatohexyl) isocyanurate and its mixtures with its higher homologs containing more than one isocyanurate ring. Compounds which are suitable, in addition to those previously mentioned, for curing at elevated temperature are capped polyisocyanates, polycarboxylic acids and their anhydrides.

The epoxide-amnine adducts according to the invention are particularly suitable for the preparation of high-solids solvent-containing clearcoats and topcoats, and for fillers. In coating compositions prepared with the epoxide-amine adducts according to the invention, it also is possible for other auxiliaries and additives which are customary in coating technology to be present. These conventional auxiliaries and additives include, in particular, catalysts, leveling agents, silicone oils, plasticizers, such as phosphates and phthalates, pigments, such as iron oxides, lead oxides, lead silicates, titanium dioxide, barium sulfate, zinc sulfide, phthalocyanine complexes, etc., and fillers, such as talc, mica, kaolin, chalk, ground quartz, ground asbestos, ground slate, various silicic acids, silicates, etc., viscosity-controlling additives, matting agents, UV absorbers and light stabilizers, antioxidants and/or peroxide scavengers, antifoams and/or wetting agents, active diluents (further reactive diluents) and the like.

The coating compositions can be applied to the respective substrate by known methods, for example by brushing, dipping, flow-coating or with the aid of rollers or blades, but in particular by spraying. They can be applied under hot conditions, and can, if desired, be brought into an application-ready form by injecting supercritical solvents (e.g. $CO_2$). Binders prepared using the epoxide-amine adducts according to the invention can be used to provide automotive refinishes, industrial coatings, wood coatings, plastics coatings, constructional coatings and textile finishes having outstanding properties. These binders can be used to prepare both intermediate coats and pigmented or unpigmented topcoats. For this purpose, the coating materials generally are cured within a temperature range from about −20 to +100° C., preferably from about −10 to +80° C.

The invention is illustrated in more detail in the examples which follow. These examples are meant only to illustrate the present invention and not to limit it. In the working examples, all percentages are mass fractions.

EXAMPLES

Example I

Preparation of Epoxide-amine Adducts (Ia.) Preparation of the Epoxide-amine Adducts (without Protecting Group)

The diamine listed in Table 1 was charged to a reactor fitted with a stirrer mechanism, an inert gas inlet, a heating and cooling system and a metering device, and was heated under an inert gas to the reaction temperature. Then, the glycidyl ester of an $\alpha a,\alpha$-dialkylalkanemonocarboxylic acid [e.g. the glycidyl ester of Versatic 10 acid (trade name: Cardura® E 10, Shell Chemicals)] was metered in over the course of 3 hours (Example a) or 4 hours (Example b). The post-reaction time was chosen so as to provide an epoxide content of 0 (Table 1).

The epoxide-amine adducts were then diluted in appropriate solvents or solvent mixtures.

TABLE 1

Preparation and properties of the epoxide-amine adducts

| Batch | Ia | Ib |
|---|---|---|
| 3,3'-Dimethyl-4,4'-diamino-dicyclohexylmethane[(1)] | 238.4 | — |
| Isophoronediamine[(2)] | — | 170.3 |
| Glycidyl ester[(3)] | 500.0 | 500.0 |
| Reaction temperature | 100° C. | 120° C. |
| Metering time in h | 3 | 4 |
| Post-reaction in h | 3 | 4 |
| Epoxide content in %[a)] | 0.0 | 0.0 |
| Characteristics: supply form (s.f.) | 90% in butyl acetate (BuOAc) | |
| Viscosity (50% in BuOAc) in mPa · s | 12.2 | 8.6 |
| GPC (PS calibration)[b)] | | |
| $M_w$ in g/mol | 1026 | 910 |
| $M_n$ in g/mol | 944 | 882 |
| $U = M_w/M_n$ | 1.09 | 1.03 |
| Hazen color number (s.f.) (DIN 53 995) | 15 | 33 |

[(1)]Trade name: Laromin ® C260 (BASF, Ludwigshafen)
[(2)]Isophoronediamine (Hüls, Marl)
[(3)]Glycidyl ester of Versatic 10 acid (trade name: Cardura ® E10, Shell Chemicals, Rotterdam)
Determination of the characteristics: Epoxide number (including amine), amine number and viscosity-for standards see 'Analytical Determination Methods', brochure from Hoechst AG Kunstharze, 1982 edition
[a)]The epoxide content can be determined by the difference between epoxide number including amine (with tetrabutylammonium bromide) and the amine number (primary or secondary-without tetrabutylammonium bromide).
[b)]GPC: $M_w$, $M_n$ Millipore ® Waters Chromatography System 860
Pump: Waters Model 590, RI detector: Waters Model 410
Column packing: Waters Ultrastyragel 1 × 1000 Å + 1 × 500 Å + 1 × 100 Å (ångstroms)
Solvent: Tetrahydrofuran at 40° C.
Flow rate: 1 ml/min, concentration: 1% based on solids
Calibration: Polystyrene (from PSS, Mainz)

As can be seen from Table 1, the epoxide-amine adducts prepared were completely reacted (determined by the epoxide content). GPC shows only the relative molar mass in relation to the polystyrene calibration. The products were uniform (U≦1.1). The epoxide-amine adducts prepared also had very low solution viscosities (50% in butyl acetate).

(Ib.) Oxazolidine Preparation—Epoxide-amine Adducts (with Temporary Protecting Group)

Epoxide-amine adduct Ib (300 g of 90% strength, 0.403 mol) were initially introduced into a 500 ml 3-neck flask equipped with a stirrer mechanism, an inert gas inlet, a heating system and a metering funnel, and 61.0 g (0.845 mol) of isobutyraldehyde were then metered in with stirring at 55° C. over the course of 4 hours. Then about 50 ml of toluene were added and the water/solvent mixture (including azeotrope) was distilled off over the course of 2 hours. The colorless to pale yellowish oxazolidine formed, Ic, could be identified by means of FT-IR:

OH band 3450 cm$^{-1}$(weak), O-C-N system: triplet 1080–1200 cm$^{-1}$.

Example II

Preparation of the Coating Materials

To prepare the curable coating compositions according to the invention, the components, including at least one epoxide-amine adduct according to the invention or of a mixture of one or more copolymers with the epoxide-amine adducts according to the invention, were mixed with the auxiliaries and additives, solvents and crosslinking agents in the mixing ratio described (Table 2). The mixtures then were adjusted using further diluent, to the spray viscosity of from 21 to 22 seconds with the flow cup (DIN 53 211, 4 mm, 23° C.). With copolymer components with low viscosity, this could be carried out without solvent, with heating to higher temperatures if required.

In a preliminary step, it was desirable to add retarding additives to the epoxide-amine adducts and to bring the mixtures to an appropriately prediluted state. It was advisable to employ the isocyanates in prediluted form as well.

Products of relatively high viscosity were, if the curable mixtures were not employed as a powder coating, dissolved or dispersed in the abovementioned diluents prior to mixing. In the case of pigmented systems, a dispersion step was first carried out in which the appropriate pigments were dispersed together with the epoxide-amine adducts according to the invention or with a mixture thereof with hydroxyl-containing copolymers, with or without the addition of an appropriate, special grinding resin, in a dispersion apparatus of suitable construction to form a pigment paste. This paste then was mixed, as is, or with the addition of further binder which is compatible with the other components of the coating system, and was made up with the addition of further diluents or typical coatings additives. In this context, the pot life and the properties of the resulting films depended on the process conditions, i.e. on the nature and quantity of the starting materials, the amount of added catalyst, the temperature regime, etc. Curing could be carried out discontinuously or continuously, for example, by means of an automatic coating apparatus.

TABLE 2

Preparation of the high-solids clearcoats with epoxide-amine adduct

| Binder | Blend RD system | RD system |
|---|---|---|
| High molar mass copolymer A2 (DE-A 43 24 801), (70%) | 20 | — |
| Copolymer of application DE-P 195 15 919.5, Example Ia (68.5%) | 20 | 63 |
| Epoxide-amine Ib * (90%) | 20 | 7 |
| Tinuvin ® 292 | 0.49 | 0.43 |
| Tinuvin ® 1130 | 1.46 | 1.28 |
| Si oil LO 50% (10% strength) | 0.98 | 0.85 |
| Solvent mixture (2:3:10) Solvesso ® 100/xylene/BuOAc | 14.63 | 12.80 |
| Desmodur ® N 3390 | 38.2 | 36.5 (80% strength) |
| Flow cup (DIN 53 211) in seconds | 21 | 21 |
| Coating designation | Coating 1 | Coating 2 |

RD Reactive diluent (epoxide-amine Ib)
* The epoxide-amine adduct was premixed with 0.8 part by weight of a 10% strength dibutyltin dilaurate solution (10% strength).
Tinuvin ®292 "HALS" (Ciba Geigy, Basle)
Tinuvin ® 1130 UV absorber (Ciba Geigy, Basle)
Si oil LO 50% Leveling agent (silicone oil from Wacker GmbH, Burghausen)
Desmodur ®N 3390 (Polyisocyanate containing isocyanurate groups (Bayer AG, Leverkusen)
BuOAc Butyl acetate After predilution as above, the clearcoats were adjusted precisely to 21 s using the same solvent mixture (Solvesso® 100/xylene/BuOAc).

Example III

Performance Testing a.) Clearcoats

The coating systems prepared as in Example II were applied to clean glass panels using a 100 μm doctor blade, and the applied coatings were tested under the conditions of air drying.

TABLE 3

Performance testing of the high-solids clearcoats with epoxide-amine adduct

| Coating designation | Coating 1 | Coating 2 |
|---|---|---|
| Appearance | transparent | transparent |
| Initial/pot life | >3 h | >6 h |
| Dust-drying time | 20' | 41' |
| Tack-free drying | 90' | 168' |
| SC-1 h, 125° C. | 68.1% | 70.1% |
| Pendulum hardness after | | |
| 24 h | 155 | 86 |
| 2 d | 179 | 102 |
| 4 d | 191 | 126 |
| 10 d | 201 | 181 |
| Premium-grade gasoline after 10 d in min. | >30 | >20 |

Pendulum hardnesses according to König (seconds)
SC: Solids content as determined by DIN 53 216
d: days
': minutes Summary As can be seen from Table 3, the high-solids polyacrylate polyol/extremely low molar mass polyacrylatepolyol/epoxide-amine adduct system had a solids content by mass whose level (about 68%) was similar to that of the extremely low molar mass polyacrylate polyol as sole binder (coating 3 in the simultaneously filed German application DE-P 195 15 919.5, the disclosure of which is incorporated by reference herein in its entirety), but with good drying and resistance to premium-grade gasoline. The extremely low molar mass polyacrylate polyol/epoxide-amine adduct system also had an even higher solids content by mass, with improved drying, pendulum hardnesses and resistance when compared to the coating designated 3 in the simultaneously filed application DE-P 195 15 919.5.

b.) Pigmentability of the Coating Materials

The measure used for the pigmentability of the coating materials was the "oil uptake" to the wetting point (Glasurit handbook "Lacke und Farben", 10th edition (1969), p. 144 ff.).

A defined quantity (5 to 10 g) of Kronos 2310 white pigment (Kronos Titan GmbH, Leverkusen) was treated dropwise with an about 70% strength solution of the binder (copolymer A2 from DE-A 43 24 801, the disclosure of which is hereby incorporated by reference herein in its entirety, copolymer Ia in the simultaneously filed application DE-P 195 15 919.5) or the mixtures (blend RD system), and mixing was performed thoroughly with a spatula after each drop. The wetting point was reached when the mass began to lump together and took on a dark appearance (Table 4).

TABLE 4

Pigmentability-wetting point of the binder systems (mass fraction in %, based on solids)

| System | Copolymer A2 (comparison) DE-A 43 24 801 | Copolymer Ia (comparison) DE-P 195 15 919.5 | Blend RD system |
|---|---|---|---|
| Wetting point Binder (mass fraction of solids) | 19.1 | 17.6 | 15.8 |

Summary

As can be seen from Table 4, comparison polymer A2 consumed the most binder in order to reach the wetting point. This was followed by the extremely low molar mass copolymer Ia (comparison), although this exhibited the problem of deficient drying in the clearcoat. The lowest binder uptake was shown by the blend system with the epoxide-amine adduct, which also showed rapid drying in the clearcoat test.

Example IV

Suitability Testing in Two-component Application
a) Coating Compositions
b) Adhesives or Sealing Compounds The epoxide-amine adduct Ib and its oxazolidine Ic (protected epoxide-amine adduct of Ib) were taken individually as initial charge and were tested for their suitability by slow addition of polyisocyanate (Desmodur® N 3390, Bayer AG, Leverkusen) under standard climatic conditions (Table 5).

TABLE 5

Suitability testing of epoxide-amine adduct/oxazolidine

| Reaction | | |
|---|---|---|
| Standard climatic conditions 23° C. | 10% | 85% rel atmos. humidity |
| Epoxide-amine adduct Ib | extremely rapid | very rapid |
| Oxazolidine Ic | very slow | moderate |

Summary

As can be seen from Table 5, the epoxide-amine adduct Ib alone could be employed preferably in the adhesives or sealing compounds industry, while the protected epoxide-amine adduct Ic (oxazolidine) would find its principal application only in the coatings industry.

The invention has been described with reference to particularly preferred embodiments and examples. Those skilled in the art will appreciate that various modifications can be made to the present invention without significantly departing from the spirit and scope thereof. In addition, all of the above-mentioned documents are incorporated herein by reference in their entirety.

What is claimed is:

1. A mixture comprising:
   a) from 0.1 to 99.9% by mass of one or more hydroxyl-containing co-polymers; and
   b) from 99.9% to 0.1% by mass of one or more epoxide-amine adducts comprising at least 20% by mass of a unit selected from the group consisting of (i) aliphatic epoxide and amine units, (ii) aliphatic epoxide units and (iii) amine units, said aliphatic epoxide units and said amine units each comprise at least one tertiary or quaternary carbon atom.

2. The mixture as claimed in claim 1, wherein the epoxide amine adduct is prepared by reacting:
   a) one or more aliphatic and/or cycloaliphatic monoepoxides having 7 to 33 carbon atoms; and
   b) one or more amine having at least two primary or secondary amino groups and 2 to 30 carbon atoms, whereby said primary or secondary amino groups are not attached directly to an aromatic structure, and wherein at least 20% by mass of said monoepoxides is selected from aliphatic and cyclo-aliphatic monoepoxides having at least one tertiary or quaternary carbon atom.

3. The mixture as claimed in claim 1, wherein the epoxide amine adduct is prepared by reacting:

a) one or more aliphatic and/or cycloaliphatic diepoxides having 8 to 50 carbon atoms; and b) one or more primary or secondary monoamines having 4 to 30 carbon atoms, whereby said primary or secondary amino groups are not attached directly to an aromatic structure, and wherein at least 20% by mass of the monoamines is selected from monoamines having at least one tertiary or quaternary carbon atom.

4. The mixture as claimed in claim 1, wherein the epoxide amine adduct is prepared by reacting:

a) one or more aliphatic and/or cycloaliphatic monoepoxides having 7 to 33 carbon atoms and b) one or more monoamine selected from primary and secondary monoamines having 4 to 30 carbon atoms, wherein said primary and secondary amino groups are not attached directly to an aromatic structure, and wherein at least a % by mass of the monoamines is selected from monoamines having at least one tertiary or quaternary carbon atom and at least b % of monoepoxides is selected from aliphatic and cycloaliphatic monoepoxides having at least one tertiary or quaternary carbon atom, the sum of a and b being at least 20 and a and b each being greater than 0.

5. The mixture as claimed in claim 2, wherein the monoepoxides are selected from glycidyl esters of α-alkylalkanemonocarboxylic acids and glycidyl esters of α,α-dialkylalkanemonocarboyxlic acids, said esters each containing 8 to 21 carbon atoms.

6. The mixture as claimed in claim 3, wherein the diepoxides are selected from the diglycidyl ethers of dihydric aliphatic alcohols and the diglycidyl esters of dibasic aliphatic carboxylic acids, said ethers containing 8 to 18 carbon atoms, and said esters containing 12 to 42 carbon atoms.

7. The mixture as claimed in claim 4, wherein the monoepoxides are selected from glycidyl esters of α-alkylalkanemonocarboxylic acids and glycidyl esters of α,α-dialkylalkanemonocarboyxlic acids, said esters each containing 8 to 21 carbon atoms.

8. The mixture as claimed in claim 2, wherein the functionality of said adduct is reduced by partial or complete reaction of functional hydroxyl and amino groups of the initially prepared epoxide-amine adduct.

9. The mixture as claimed in claim 3, wherein the functionality of said adduct is reduced by partial or complete reaction of functional hydroxyl and amino groups of the initially prepared epoxide-amine adduct.

10. The mixture as claimed in claim 4, wherein the functionality of said adduct is reduced by partial or complete reaction of functional hydroxyl and amino groups of the initially prepared epoxide-amine adduct.

11. The mixture as claimed in claim 8, wherein during the reaction, the functional groups are blocked by reaction to form temporary protecting groups.

12. The mixture as claimed in claim 11, wherein the temporary protecting groups comprise one or more oxazolidine compounds.

13. The mixture as claimed in claim 1, wherein the hydroxyl-containing copolymers are selected from acrylate copolymers, polyesters and polyester-modified acrylate copolymers.

14. The mixture as claimed in claim 1, wherein the hydroxyl-containing copolymers are selected from:

aa) copolymers obtained by copolymerization of at least two vinyl monomers of which at least one comprises at least one hydroxyl group;

ab) copolymers obtained by copolymerization of at least two vinyl monomers of which at least one has at least one acid group, wherein said monomers are reacted, before, during or after polymerization, with at least one compound which reacts with the acid groups to form an ester with the formation of at least one hydroxyl group; and ac) copolymers obtained by copolymerization of at least two vinyl monomers of which at least one has at least one hydroxyl group, wherein said monomers are reacted, before, during or after polymerization, with at least one compound which reacts partly or completely with the hydroxyl groups to form an ester with the formation of at least one hydroxyl group.

15. The mixture as claimed in claim 1, wherein a) comprises a mixture of hydroxyl-containing copolymers which each have a hydroxyl number of from 10 to 250 mg/g and of which at least one copolymer has a weight-average molar mass of more than 3500 g/mol and at least one copolymer has a weight-average molar mass of below 3500 g/mol.

* * * * *